United States Patent
Treadway

(10) Patent No.: US 10,724,694 B2
(45) Date of Patent: Jul. 28, 2020

(54) SOLID STATE LIGHT ASSEMBLY FOR FLUSH MOUNTED LIGHTING FIXTURES

(71) Applicant: MaxLite, Inc., West Caldwell, NJ (US)

(72) Inventor: Patrick Treadway, Rancho Cucamonga, CA (US)

(73) Assignee: MAXLITE, INC., West Caldwell, NJ (US)

( * ) Notice: Subject to any disclaimer, the term of this patent is extended or adjusted under 35 U.S.C. 154(b) by 81 days.

(21) Appl. No.: 15/389,523

(22) Filed: Dec. 23, 2016

(65) Prior Publication Data

US 2017/0191629 A1      Jul. 6, 2017

Related U.S. Application Data

(60) Provisional application No. 62/273,025, filed on Dec. 30, 2015, provisional application No. 62/287,144, filed on Jan. 26, 2016.

(51) Int. Cl.
| | |
|---|---|
| *F21S 8/04* | (2006.01) |
| *F21V 3/06* | (2018.01) |
| *F21V 13/04* | (2006.01) |
| *F21V 29/70* | (2015.01) |
| *F21K 9/66* | (2016.01) |
| *F21K 9/20* | (2016.01) |
| *F21V 15/00* | (2015.01) |
| *F21V 17/10* | (2006.01) |
| *F21V 23/00* | (2015.01) |
| *F21V 29/89* | (2015.01) |
| *F21Y 115/10* | (2016.01) |
| *F21Y 115/15* | (2016.01) |

(52) U.S. Cl.
CPC .............. *F21S 8/04* (2013.01); *F21K 9/20* (2016.08); *F21K 9/66* (2016.08); *F21V 3/061* (2018.02); *F21V 13/04* (2013.01); *F21V 15/00* (2013.01); *F21V 17/101* (2013.01); *F21V 23/005* (2013.01); *F21V 29/70* (2015.01); *F21V 29/89* (2015.01); *F21Y 2115/10* (2016.08); *F21Y 2115/15* (2016.08)

(58) Field of Classification Search
CPC ................................................... F21V 3/0418
See application file for complete search history.

(56) References Cited

U.S. PATENT DOCUMENTS

| | | | | |
|---|---|---|---|---|
| 2,568,893 | A * | 9/1951 | Krauthamer | F21S 8/02 248/320 |
| 4,697,950 | A * | 10/1987 | Copeland | E01C 17/00 116/63 R |
| 9,453,635 | B1 * | 9/2016 | Fuller | F21V 29/71 |
| 9,622,314 | B1 * | 4/2017 | Li | H05B 33/0845 |
| 2011/0193463 | A1 * | 8/2011 | Daniel | F21V 29/004 313/46 |
| 2012/0170255 | A1 * | 7/2012 | McMillan | F21S 8/04 362/147 |
| 2013/0027929 | A1 * | 1/2013 | McMillan | F21V 17/002 362/235 |
| 2014/0078723 | A1 * | 3/2014 | Chen | F21V 23/023 362/184 |
| 2017/0097148 | A1 * | 4/2017 | Burns | F21V 23/0485 |
| 2017/0277030 | A1 * | 9/2017 | McMillan | G03B 21/2033 |

* cited by examiner

*Primary Examiner* — Zheng Song
(74) *Attorney, Agent, or Firm* — Budzyn IP Law, LLC

(57) ABSTRACT

An assembly is provided herein for a lighting fixture and for retrofitting a flush mounted light fixture to be provided with solid state lighting.

16 Claims, 3 Drawing Sheets

SOLID STATE LIGHT ASSEMBLY FOR FLUSH MOUNTED LIGHTING FIXTURES

CROSS-REFERENCES TO RELATED APPLICATIONS

This application claims priority to U.S. Provisional Patent Application No. 62/273,025 filed Dec. 30, 2015, and, to U.S. Provisional Patent Application No. 62/287,144, filed Jan. 26, 2016, the contents of which are incorporated by reference herein.

BACKGROUND OF THE INVENTION

Flush mounted lighting fixtures, which are typically ceiling mounted, are well known in the prior art. These lighting fixtures are typically provided with E26 sockets, or the like, for incandescent bulbs, or GU24 sockets, or the like, for compact fluorescent bulbs.

Solid state lighting, such as provided by light emitting diodes (LED's), organic light emitting diodes (OLED's), or polymer light emitting diodes (PLED's), has been found to be more energy efficient than incandescent or fluorescent lighting. Thus, there has been a movement to utilize solid state lighting over incandescent or fluorescent lighting. Light fixtures configured for incandescent or fluorescent lighting must be retrofitted to accommodate solid state lighting, if there is a desire to retain the light fixtures for use with solid state lighting.

SUMMARY OF THE INVENTION

An assembly is provided herein for a lighting fixture and for retrofitting a flush mounted light fixture to be provided with solid state lighting.

DETAILED DESCRIPTION OF THE INVENTION

Figure 1:
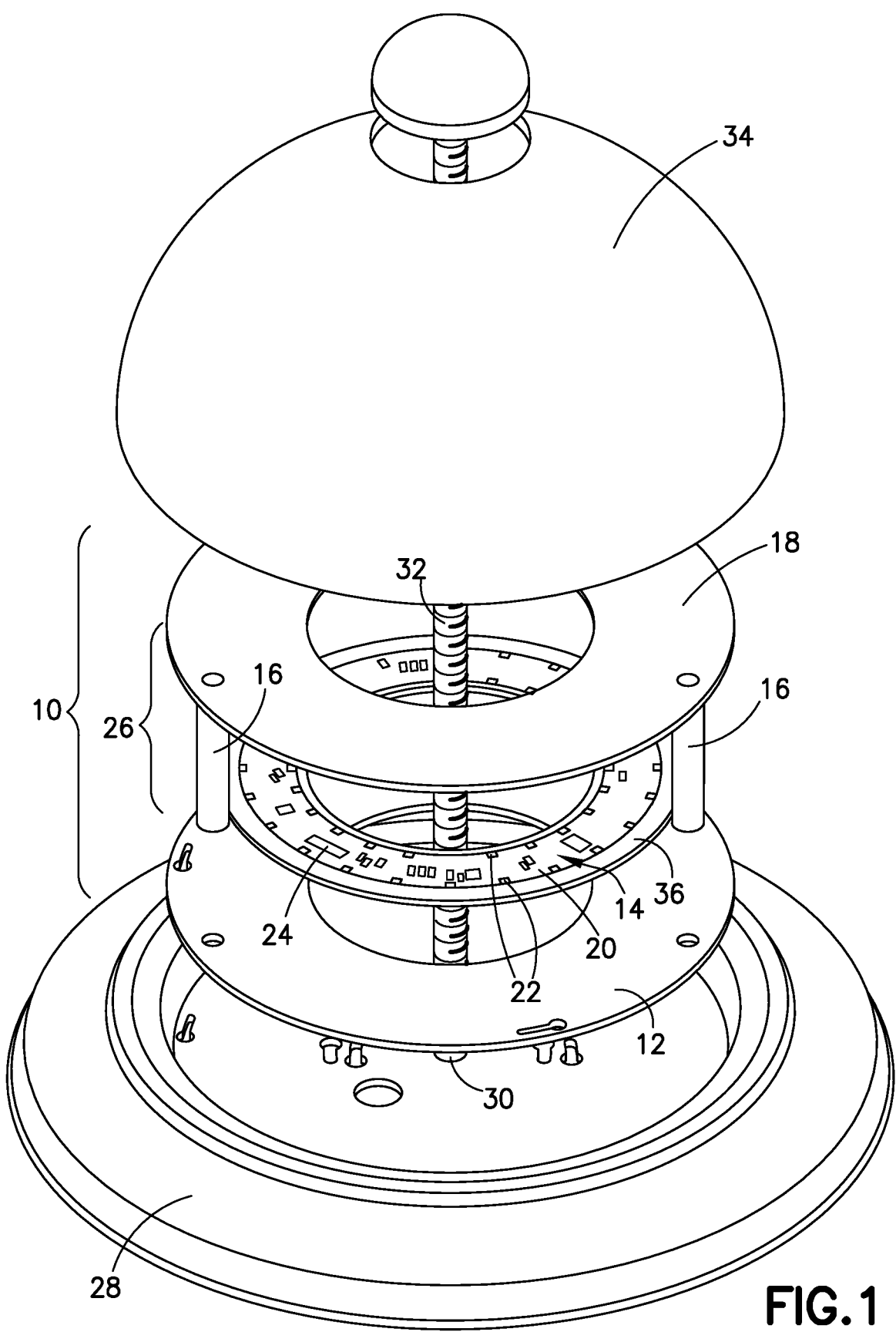
FIG. 1 is an exploded view of a lighting fixture in accordance with the subject invention.
Figure 2:
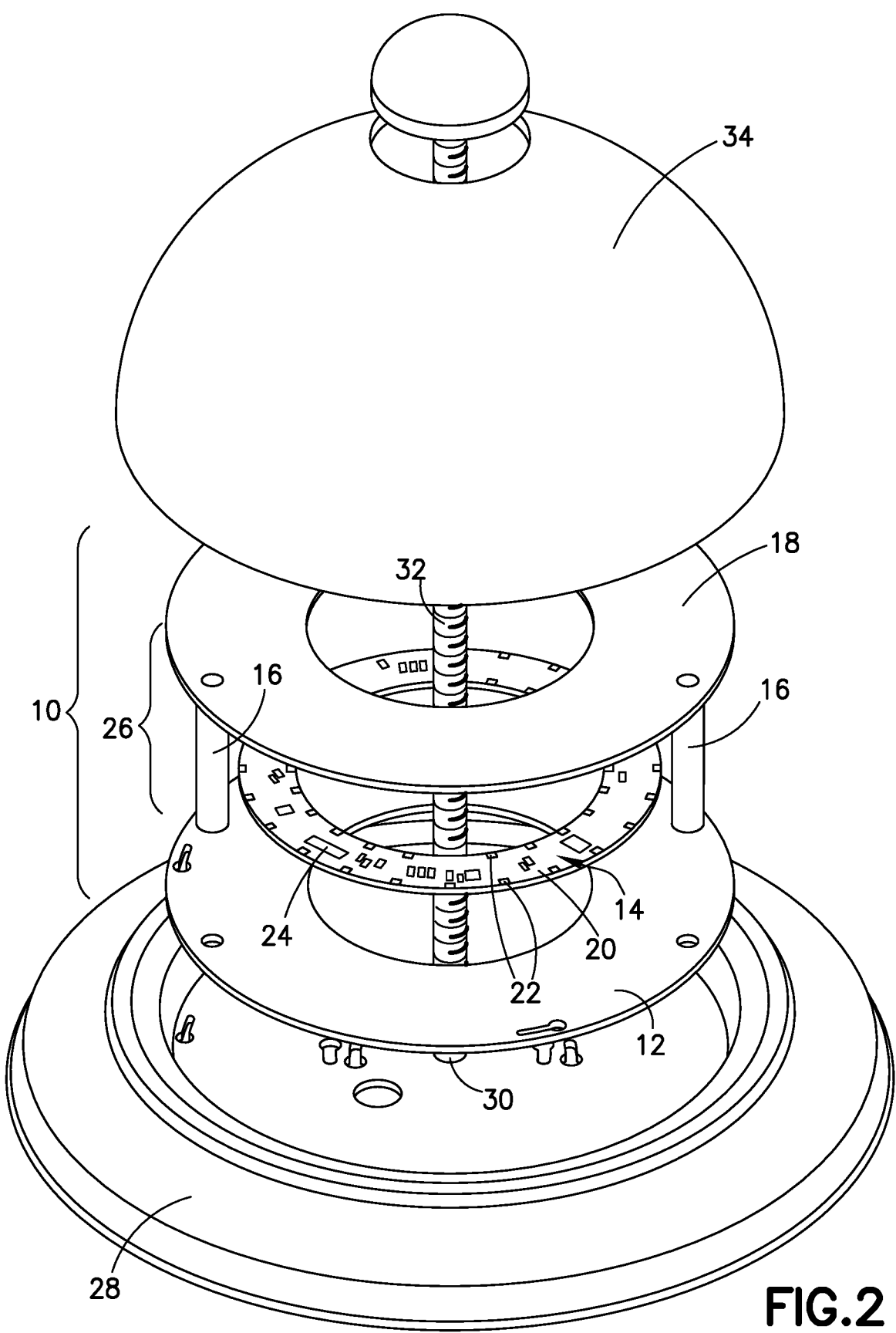
FIG. 2 is an exploded view of a lighting fixture in accordance with the subject invention.
Figure 3:
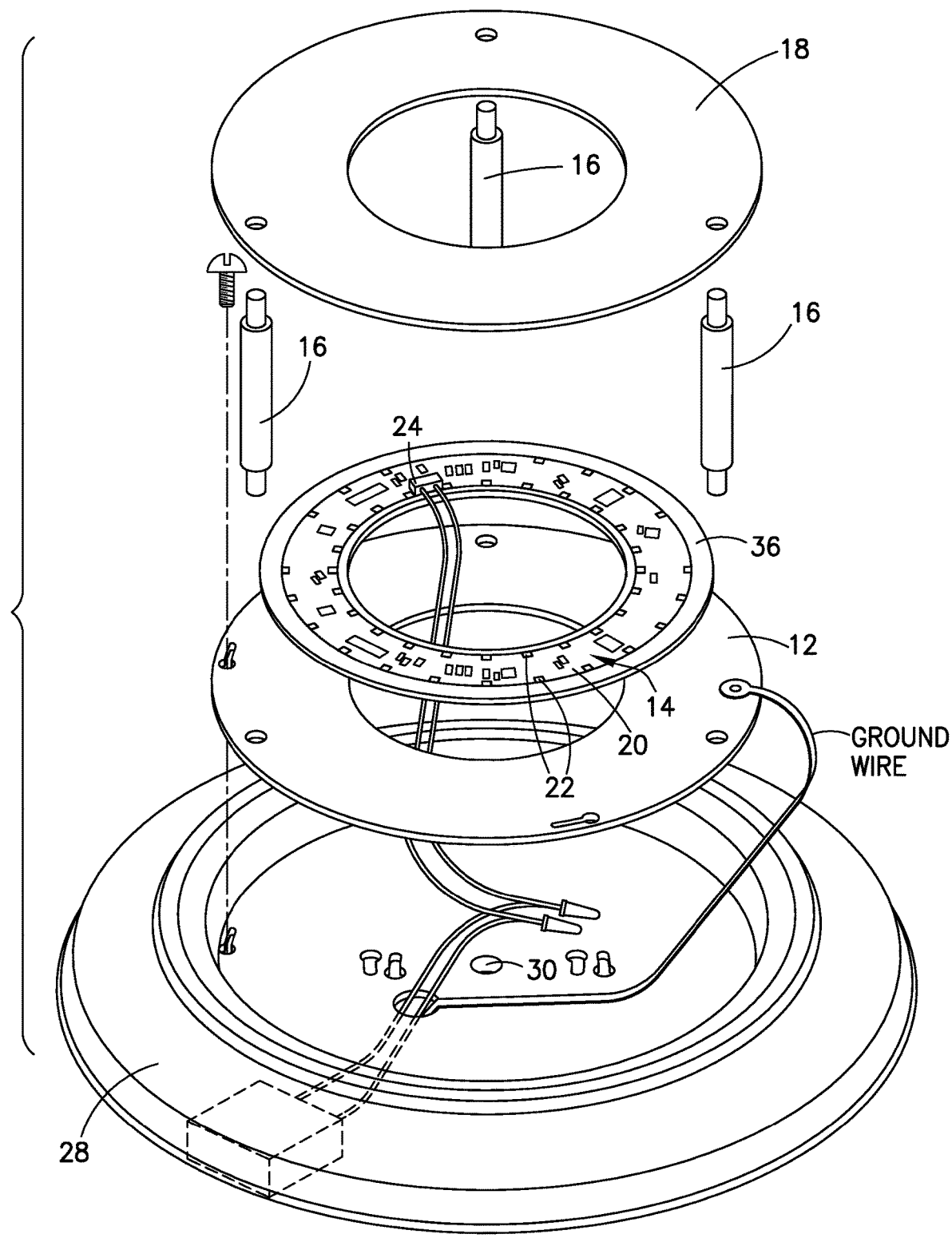
FIG. 3 is an exploded view of an assembly in accordance with the subject invention.

With reference to the attached Figures, an assembly 10 may be provided which includes a carrier 12, a lighting unit 14, stand offs 16 and a protective barrier 18. Preferably, the carrier 12 is formed of metal, such as sheet metal or aluminum, and is sized to accommodate the lighting unit 14. The carrier 12 preferably has thermal conductive properties to dissipate heat generated by the lighting unit 14. The lighting unit 14 preferably includes a printed circuit board 20 to which one or more light elements 22, which may be in the form of light generating diodes, such as LED's, OLED's, and/or PLED's, are electronically coupled to a driver 24. The driver 24 is configured to convert incoming alternating current power to direct current power for the light elements 22. Additional features may be included with the lighting unit 14, including a dimmer, detection sensors (e.g., motion detection) and/or a bluetooth or other wireless receiver for receiving control commands from a remote source. The lighting unit 14 may be mounted or affixed to the carrier 12 in any known manner.

The stand offs 16 are mounted or affixed, on one hand, to the lighting unit 14 and/or the carrier 12, and, on the other hand, to the barrier 18, preferably defining a space 26 therebetween. It is preferred that the stand offs 16 be mounted permanently to the lighting unit 14 and the barrier 18, such as by gluing, fusing, riveting and the like, so that the barrier 18 may be only removed from the stand offs 16 through destructive means. The stand offs 16 may be of various materials which are stable in relatively warm environments, including being of polymeric material(s), e.g., nylon, and/or metal.

The barrier 18 may be of glass or other materials (e.g., polymeric materials) which satisfy UL 94 5VA flammability rating. It is also preferred that the barrier 18 be sufficiently light transmissive to permit light generated by the lighting unit 14 to pass therethrough. The barrier 18 is sized and shaped to limit contact with the lighting unit 14, particularly where high voltage sources, the light elements 22 and other components are mounted, by a user. Preferably, the barrier has an outer footprint at least as great as the light elements 22 of the lighting unit 14—i.e., the outer footprint of the barrier 18 causes the barrier 18 to at least overlap completely the area of the light elements 22 of the lighting unit 14. The barrier 18 preferably overlaps the lighting unit 14 at a minimum and may be formed with a greater footprint from the lighting unit 14.

The assembly 10 is preferably provided as a pre-assembled kit which is ready for mounting. The assembly 10 may be formed in different shapes, including being annular to allow for mounting into a round flush mounted light fixture pan 28 with a center space 30 permitting mounting hardware 32 for a corresponding diffuser 34. Other shapes are possible.

Optionally, a thermal pad or other conductive barrier (e.g., a layer of grease) 36 (FIG. 1) may be provided with the assembly 10, for example between the lighting unit 14 and the carrier 12. The thermal pad or conductive barrier 36 further acts to conduct heat form the lighting unit 14 to the carrier 12.

It is possible to provide the assembly 10 in pre-assembled sub-elements, such as the barrier 18, the stand offs 16 and the lighting element 14 being provided unitarily with separate assembly of the carrier 12 and the thermal pad or other conductive barrier 36 if provided.

For retrofit, an existing socket or sockets is removed from the pan 28 or other base element of an existing light fixture such as a flush mounted light fixture (which may be ceiling mounted). The assembly 10 described herein may be secured to the pan 28 or base element using screws or other known fasteners. The power supply wires which were used to provide standard alternating current power (e.g., 110/120 VAC or 220/240 VAC) to the socket(s), and are now disconnected, are connected to the driver 24 to provide power thereto. The carrier 12 may be ground to the base or pan 28 as well if necessary. The power supply wires may be pulled through an opening of the assembly 10 for possible easier connection to the driver 24. With the alternating current power supply electrically coupled to the driver 24, the lighting unit 14 is fully powered to provide light.

As an alternative, the assembly 10 of the lighting unit 14, the stand offs 16 and the barrier 18 may be provided with a flush mounted light fixture, sold as a new product. Here, the assembly 10 is provided as the light source with no retrofitting required. The carrier 12 and/or the thermal pad or other-conductive barrier 36 may be optionally utilized.

What is claimed is:

1. A lighting fixture comprising:
   a disc-shaped carrier including a carrier opening;
   a lighting unit including a plurality of light generating elements and a driver configured to convert incoming alternating current power to direct current power for said plurality of light generating elements, said lighting unit defining a lighting unit opening with said light generating elements located about said lighting unit opening, wherein said lighting unit is fixed to said carrier with said carrier opening being aligned with said lighting unit opening, and, wherein said lighting unit has an outer perimeter which defines a diameter;
   a barrier sized and shaped to limit contact with said lighting unit, said barrier including a central opening, wherein said barrier is sufficiently light transmissive to permit light generated by said lighting unit to pass therethrough; and,
   a plurality of stand offs mountingly supporting said barrier relative to said lighting unit in a spaced-apart relationship with said central opening of said barrier aligned with said lighting unit opening and said carrier opening to define an open passageway for passage therethrough of mounting hardware for the lighting fixture, wherein said stand offs are fixed to said barrier and to said carrier with the lighting unit being located between said carrier and said barrier and said diameter of said lighting unit being less than spacing between each of said stand offs and a center of said open passageway.

2. The lighting fixture of claim 1, wherein said barrier is made of glass.

3. The lighting fixture of claim 1, wherein said barrier is made of a material which satisfies UL 94 5VA flammability rating.

4. The lighting fixture of claim 1, wherein said carrier is metallic.

5. The lighting fixture of claim 1, further comprising a thermal pad located between said lighting unit and said carrier.

6. The lighting fixture of claim 1, further comprising a conductive barrier located between said lighting unit and said carrier, said conductive barrier configured to conduct heat from said lighting unit to said carrier.

7. The lighting fixture of claim 1, wherein said barrier at least overlaps the light generating elements.

8. The lighting fixture of claim 7, wherein, said barrier extends radially outwardly, away from said central opening, beyond said light generating elements to define a larger footprint than said lighting unit.

9. A retrofit assembly for flush mounted light fixtures, the assembly comprising:
   a disc-shaped carrier including a carrier opening;
   a lighting unit including a plurality of light generating elements and a driver configured to convert incoming alternating current power to direct current power for said plurality of light generating elements, said lighting unit defining a lighting unit opening with said light generating elements located about said opening, wherein said lighting unit is fixed to said carrier with said carrier opening being aligned with said lighting unit opening, and, wherein said lighting unit has an outer perimeter which defines a diameter;
   a barrier sized and shaped to limit contact with said lighting unit, said barrier including a central opening, wherein said barrier is sufficiently light transmissive to permit light generated by said lighting unit to pass therethrough; and,
   a plurality of stand offs mountingly supporting said barrier relative to said lighting unit in a spaced-apart relationship with said central opening of said barrier aligned with said lighting unit opening and said carrier opening to define an open passageway for passage therethrough of mounting hardware for the lighting fixture, wherein said stand offs are fixed to said barrier and to said carrier with the lighting unit being located between said carrier and said barrier and said diameter of said lighting unit being less than spacing between each of said stand offs and a center of said open passageway.

10. The lighting fixture of claim 9, wherein said barrier is made of glass.

11. The lighting fixture of claim 9, wherein said barrier is made of a material which satisfies UL 94 5VA flammability rating.

12. The lighting fixture of claim 9, wherein said carrier is metallic.

13. The lighting fixture of claim 9, further comprising a thermal pad located between said lighting unit and said carrier.

14. The lighting fixture of claim 9, further comprising a conductive barrier located between said lighting unit and said carrier, said conductive barrier configured to conduct heat from said lighting unit to said carrier.

15. The lighting fixture of claim 9, wherein said barrier at least overlaps the light generating elements.

16. The lighting fixture of claim 15, wherein, said barrier extends radially outwardly, away from said central opening, beyond said light generating elements to define a larger footprint than said lighting unit.

* * * * *